(12) United States Patent  
Takeyama et al.

(10) Patent No.: US 6,343,018 B1  
(45) Date of Patent: Jan. 29, 2002

(54) CARD CONNECTOR MOUNTING STRUCTURE

(75) Inventors: Tetsuo Takeyama, Tokyo; Minoru Igarashi, Chiba-ken, both of (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 0 days.

(21) Appl. No.: 09/490,074

(22) Filed: Jan. 24, 2000

(30) Foreign Application Priority Data

Jan. 25, 1999 (JP) .......................................... 11-015913

(51) Int. Cl.⁷ ........................... H01R 13/00; H05K 7/10
(52) U.S. Cl. ..................... 361/737; 361/740; 361/752; 361/759; 361/808; 439/630; 439/954; 379/429; 455/575
(58) Field of Search ................................ 361/737, 684, 361/686, 740, 741, 752, 754, 756, 759, 796–798, 801, 802, 807–810; 439/325, 326, 630, 636, 637, 954; 235/439–441, 479, 482, 483, 486; 379/428, 429; 455/90, 347, 575

(56) References Cited

U.S. PATENT DOCUMENTS

| | | | | |
|---|---|---|---|---|
| 4,743,746 A | * | 5/1988 | Murschall et al. | 235/486 |
| 4,752,234 A | * | 6/1988 | Reichardt et al. | 439/260 |
| 4,764,414 A | * | 8/1988 | Beun | 361/802 |
| 4,862,400 A | * | 8/1989 | Selbrede | 361/796 |
| 5,052,942 A | * | 10/1991 | Rauterberg et al. | 439/326 |
| 5,174,780 A | * | 12/1992 | Yang Lee | 439/326 |
| 5,460,537 A | * | 10/1995 | Noschese | 439/326 |
| 5,511,985 A | * | 4/1996 | Noschese et al. | 439/637 |
| 5,814,805 A | * | 9/1998 | Reichardt et al. | 235/479 |
| 6,097,605 A | * | 8/2000 | Klatt et al. | 361/737 |
| 6,116,509 A | * | 9/2000 | Angelo et al. | 235/479 |

* cited by examiner

*Primary Examiner*—Jeffrey Gaffin  
*Assistant Examiner*—John B. Vigushin  
(74) *Attorney, Agent, or Firm*—Wenderoth, Lind & Ponack, L.L.P.

(57) ABSTRACT

A mounting structure of a card connector includes a connector body surface mounted on a wiring circuit board. An IC card can be withdrawably inserted into the connector body so that the IC card can be connected to the wiring circuit board through the connector body. The connector body includes a card insertion space which is disposed at an angle of inclination with respect to an upper surface of the wiring circuit board. A card inlet/outlet port is formed at an upper inclination end of the card insertion space such that the IC card inserted into the card insertion space through the card inlet/outlet port is retained for connection at an angle of inclination.

8 Claims, 5 Drawing Sheets

CARD CONNECTOR MOUNTING STRUCTURE

BACKGROUND OF THE INVENTION

1. Field of the Invention

This invention relates to an IC card connector used for such electronic devices as telephones, cash dispensers, personal computers, cameras and the like.

2. Related Art

Before describing the art related to the present invention, it should be noted that the term "IC card" herein used refers to a card which contains a write/read memory or both a memory and a CPU and which can be put into a purse, a handbag, a pocket or the like for carriage. The IC card of this type is inserted for use in the above-mentioned electronic device. A conventional card connector mounted on a wiring circuit board is built in a given electronic device and an IC card is inserted into and withdrawn from the card connector in its posture held in parallel relation to a wiring circuit board into a card insertion space of the card connector through a card inlet/outlet port formed in an external wall of the electronic device. In the conventional card connector, it is essentially required to form a card inlet/outlet port in the external wall of the electronic device. On the other hand, there are many commercially available electronic devices of the type in which in order to prevent foreign matter from entering through the card inlet/outlet port and to prevent an IC card from slipping out due to vibrations or the like, a closure member is provided on an external wall of such electronic devices such that when the closure member is open, a card connector is exposed and the IC card is withdrawably inserted directly into the exposed card connector and then the closure member is closed. Such electronic devices include, for example, portable telephones, digital cameras and the like.

In those conventional electronic devices, it is typical that the card connector or the electronic device body is provided with a card pressing closure member. In use, the card pressing closure member is opened to place an IC card on the contacts or an IC card is inserted into the card pressing closure member and then, the card pressing closure member is closed to push the IC card against the contacts for pressure contact. In some instances, the pressing closure member serves also as a battery case.

In any one of the above mentioned conventional devices, it is essentially required to employ an additional pressing closure member solely for the purpose of providing pressure contact, which naturally results in cost increase, inferior performance in card inserting/withdrawing operation, slippage of contacting position, etc. In addition, the pressing closure member is liable to be damaged by external force.

The present invention has been accomplished in view of the above-mentioned problems inherent in the prior art devices,

SUMMARY OF THE INVENTION

It is, therefore, an object of the present invention to provide a mounting structure of a card connector which is capable of solving the above-mentioned problems efficiently.

In order to achieve the above object, there is essentially provided a mounting structure of a card connector having a connector body which is surface mounted on a wiring circuit board, an IC card being allowed to be withdrawably inserted into the connector body so that the IC card can be connected to the wiring circuit board through the connector body, wherein the connector body includes a card insertion space which is disposed at an angle of inclination with respect to an upper surface of the wiring circuit board, a card inlet/outlet port being formed in an upper inclination end of the card insertion space such that the IC card inserted into the card insertion space through the card inlet/outlet space is retained for connection at an angle of inclination.

From another aspect of the present invention, there is also provided a mounting structure of a card connector in which a base plate having contacts for contacting an IC card is surface mounted on an upper surface of a wiring circuit board through the contacts, wherein an upper surface of the base plate is inclined with respect to the upper surface of the wiring circuit board, a card insertion space being formed by the inclination surface of the base plate, a card inlet/outlet port for inserting the IC card therein being formed at an upper inclination end of the base plate from the upper inclination end to a lower inclination end, the IC card being retained in an inclination posture within the card insertion space so that the IC card can be pressure contacted with the contacts of the base plate.

In one preferred embodiment of the present invention, the contacts are aranged in array on both the upper inclination end side and the lower inclination end side, and a surface mounting terminal of each of the contacts which are arranged on the upper inclination end side is allowed to project towards the surface mounting side of the upper inclination end, while a surface mounting tenninal of each of the contacts which are arranged on the lower inclination end side is allowed to project towards the surface mounting side of the lower inclination end.

By virtue of the above-mentioned construction, there is no need to provide an IC pressing cover member with respect to the card connector which is exposed by opening a closure member formed on the external wall of a given electronic device. The IC card may simply be inserted into the device slantwise from outside for reliable pressure contact. The card connector can be simplified in structure and decreased in cost. Moreover, the contacting position can be prevented from slipping and the performance of the card inserting/withdrawing operation can be enhanced.

In addition, irrespective of whether a card inlet/outlet port is formed in an external wall of a given electronic device or a closure member is provided, the IC card can easily be inserted or withdrawn from slantwise above and the IC card can be prevented from being accidentally slippingly withdrawn by vibrations.

DETAILED DESCRIPTION OF THE EMBODIMENTS

Embodiments of the present invention will now be described with reference to FIGS. 1 to 9.

Figure 1:
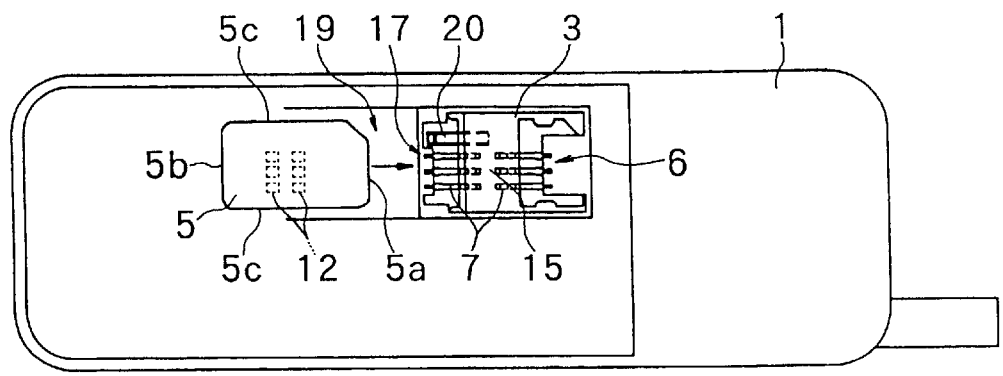
FIG. 1 is a plan view showing a portable telephone incorporated with the present invention, in which a closure member is in an open position.
Figure 2:
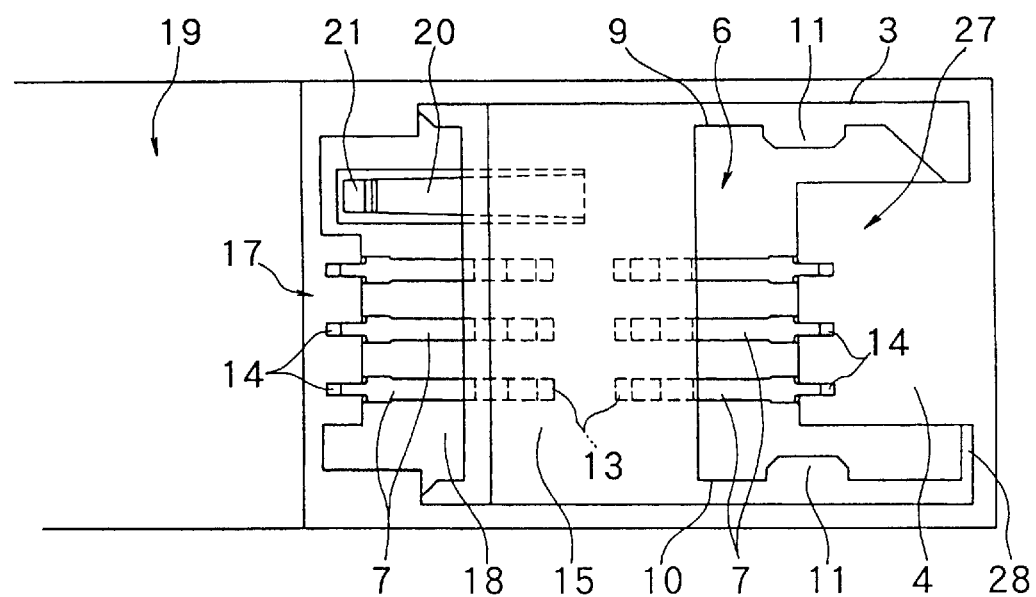
FIG. 2 is an enlarged plan view of the above.
Figure 3:
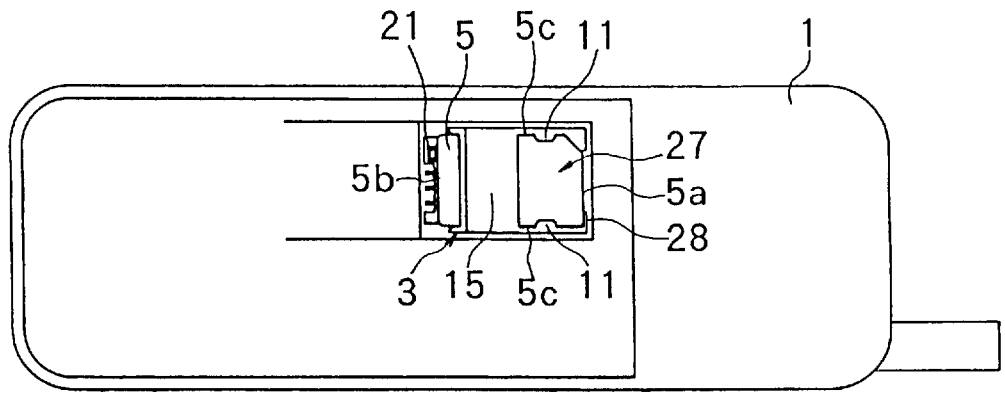
FIG. 3 a plan view of the portable telephone of FIG. 1 but with an IC card inserted therein.

FIGS. 1 to 4 show a portable telephone as a representative example of an electronic device 1. This portable telephone includes a closure member 2 which also serves as a battery case. When the closure member 2 is opened, a card connector body 3 and a part of a wiring circuit board 4 on which the connector is surface mounted are exposed within an opening plane as shown in FIG. 3.

Figure 4:
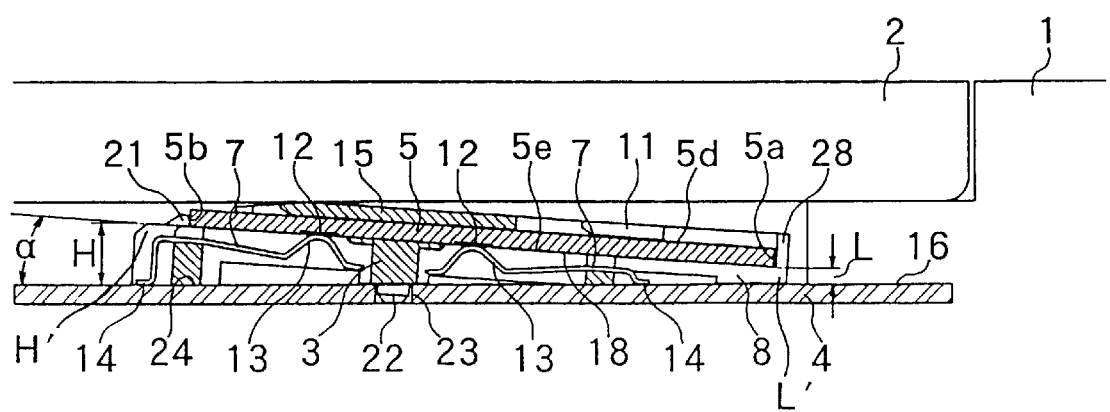
FIG. 4 is an enlarged sectional view of a card connector of FIG. 3, in which closure member is in a closed position.

An IC card 5 is inserted into a card insertion space 6 which is defined within the exposed card connector body 3 and pressure contacted with contacts 7 which are arranged with respect to the card insertion space 6 as shown in FIGS. 3 and 4.

The battery case in the form of the closure member 2 of the card insertion space 6 is closed to hide the connector body 3 into which the IC card 5 has been inserted.

Figure 6:
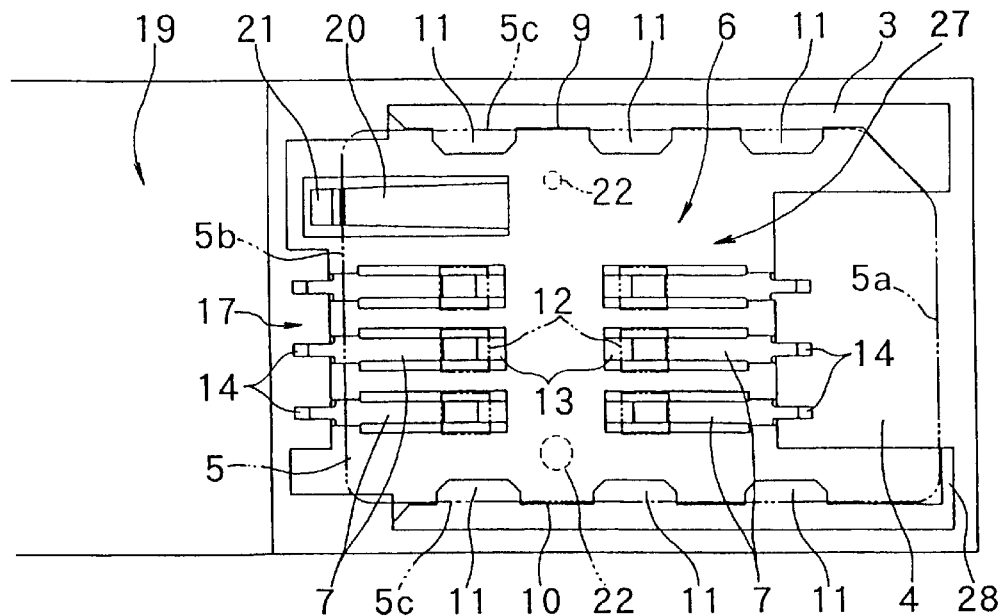
FIG. 6 is an enlarged plan view of a card connector having an upper abutment member formed of a top plate, while a comparable abutment member of the card connector shown in FIGS. 1 to 5 is formed of an engagement element.
Figure 7:
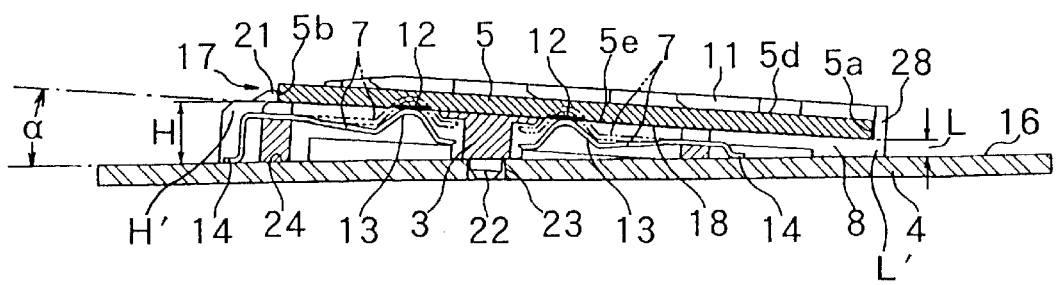
FIG. 7 is a sectional view taken on a line passing through a contact of FIG. 6.
Figure 8:
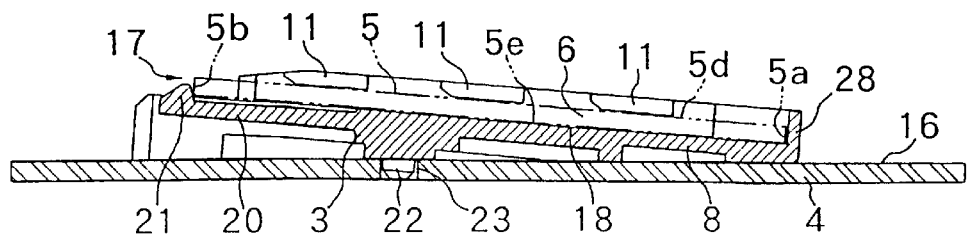
FIG. 8 is a sectional view taken on a line through a latch arm of FIG. 6.

The connector body 3 includes a first and a second side wall 9, 10 extending in opposing relation to a right and a left side edge of a generally rectangular base plate 8, i.e., raised in such a manner as to extend along the card insertion/withdrawal direction. As shown in FIGS. 6 to 8, engagement elements 11 project from the upper surfaces of the first and second side walls 9, 10 towards the interior of the card insertion space 6. The first and second side walls 9, 10 are adapted to restrict left and right side surfaces 5c of the IC card 5, while the engagement elements 11 restrict the upper surfaces 5d of the left and right side edges of the IC card 5 in order to prevent upward ejection of the IC card 5.

The card insertion space 6 is defined by the base plate 8, the first and second side walls 9, 10 and the engagement elements 11.

On the other hand, in FIGS. 1 to 5, a top plate 5 is provided, instead of the engagement elements 11, between the first side wall 9 and the second side wall 10 in such a manner as to be opposite the base plate 8.

The first and second side walls 9, 10 restrict the left and right side surfaces 5c of the IC card 5, while the top plate 15 restricts the upper surface 5d of the IC card 5 in order to prevent upward ejection of the IC card 5.

The card insertion space 6 is defined by the Lop plate 15, the base plate 8, and the first and second side walls 9, 10.

The base plate 8 has a plurality of contacts 7 implanted therein. Those contacts 7 are adapted to contact the IC card 5. Each of the contacts 7 is formed of a resilient elongate element and has a contacting terminal 13 at its inner end. Those contacting terminals 13 are pressure contacted with a plurality of electrode pads 12 arranged on the undersurface 5e of the IC card 5. Each of the contacts 7 has a surface mounting terminal 14 at its outer end. The surface mounting terminals 14 project to the extent that distal ends thereof are generally at the same level as the undersurface 24 of the base plate 8 and are subjected to surface mounting with respect to a circuit pattern of the wiring circuit board 4.

As described above, the present invention provides a mounting structure of a card connector having the connector body 3 which is surface mounted on the wiring circuit board 4, the IC card 5 being allowed to be withdrawably inserted into the connector body 3 so that the IC card 5 can be connected to the wiring circuit board 4 through the contacts 7 disposed on the base plate 8 of the connector body 4, wherein the connector body 3 includes the card insertion space 6 which is disposed at an angle of inclination with respect to the upper surface 16 of the wiring circuit board 4.

One end of the base plate 8 forming the card connector body 3 is of a greater height H than the other end which is of height L.

A card inlet/outlet port 17 is formed in an upper inclination end H' of the card insertion space 6. The IC card 5, which has been inserted into the card insertion space 6 through the card inlet/outlet port 17, is retained at an inclination angle α for the connection.

As mentioned above, the card connector body 3 is surface mounted on the upper surface 16 of the wiring circuit board 4 through the contacts 7 which are arranged on the base plate 8 for contacting the IC card 5.

The upper surface of the base plate 8 is defined as an inclination surface 18 which is inclined at angle α with respect to the upper surface 16 of the wiring circuit board 4. The card insertion space 6 is formed in the inclination surface 18 of the base plate 8. The card inlet/outlet port 17 for allowing insertion of the IC card 5 from the upper inclination end H' towards the lower inclination end L' is formed in the upper inclination end H' of the card insertion space 6. The IC card 5 is retained in its inclined posture within the card insertion space 6 so as to be pressure contacted with the contacts 7 which are arranged on the base plate 8.

As shown in FIGS. 2 and 6, as well as in elsewhere, the contacts 7 are arranged in array on both the upper inclination end H' side and the lower inclination end L' side. The surface mounting terminals 14 of the contacts which are arranged on the upper inclination end H' side are allowed to project towards the surface mounting side of the upper inclination end H' side, while the surface mounting terminals 14 of the contacts 7 which are arranged on the lower inclination end L' side are allowed to project towards the lower inclination end L' side. The terminals 13 of the contacts 7 are allowed to project a predetermined amount above the inclination surface 18 and held in the standby position.

The construction of the present invention will now be described with reference to the card insertion flowchart shown in FIGS. 5A to 5D. As shown in FIGS. 5A to 5D, the IC card 5 is inserted into the card inlet/outlet port 17 from slantwise above. Subsequently, the IC card 5 is inserted into the card insertion space 6 from the upper inclination end H' towards the lower inclination end L' through its inclination insertion locus.

Figure 5A:
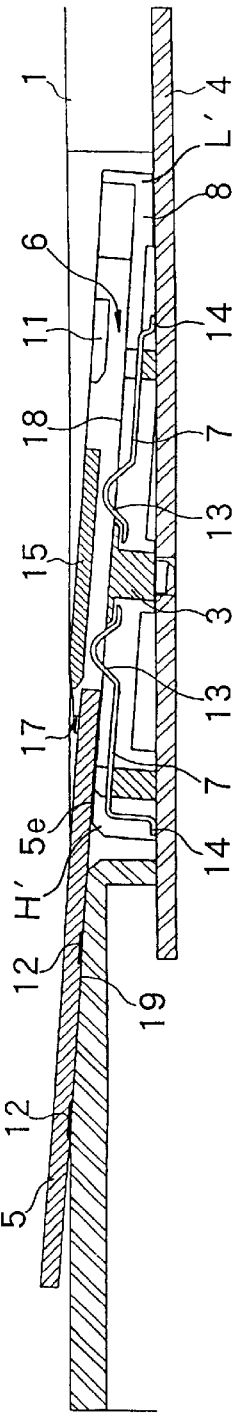
FIGS. 5A to 5D show sectional views for explaining a series of operations for inserting an IC card into the card connector in a sequential manner.
Figure 5B:
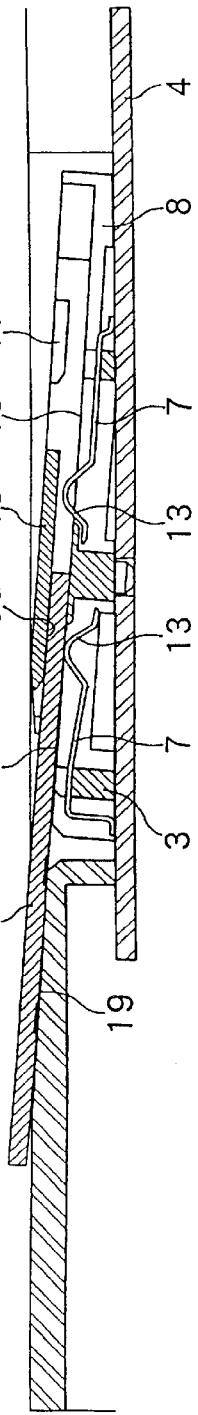
Figure 5C:
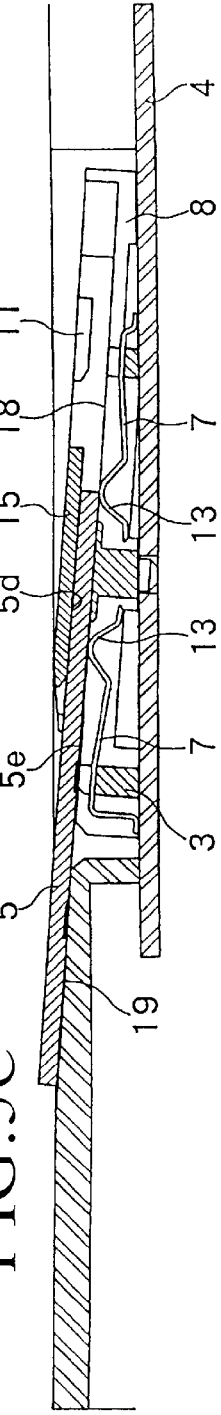
Figure 5D:
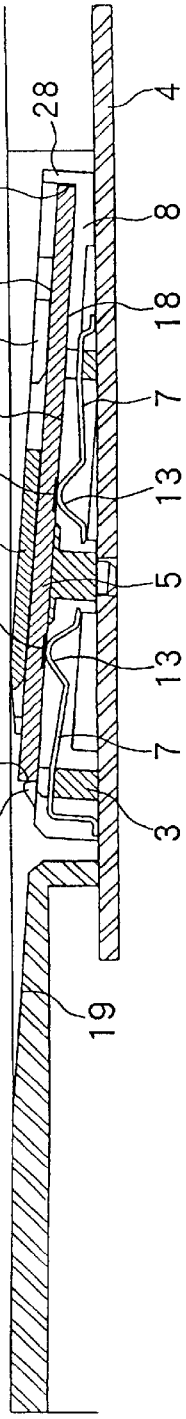

As shown in FIGS. 5A and 5B, in the early stage of insertion of the IC card 5, a front end face 5a of the IC card 5 presses the contacting terminal 13 of the contact 7, which is arranged on the upper inclination end H' side, downward against its resiliency. As the insertion of the IC card 5 is progressed, as shown in FIGS. 5C and 5D, the front end face of the IC card 5 presses the contacting terminal 13 of the contact 7, which is arranged on the lower inclination end L', downward against its resiliency. When the front end face 5a of the IC card 5 hits a front end wall (guide stopper) 28 which is raised from the lower inclination end L' of the base plate 8, the insertion of the IC card 5 is completed.

When insertion of the IC card 5 has been completed, the contacting terminal 13 is pressure contacted with the electrode pad 12 arranged on a lower surface 5e of the IC card 5 by reaction thereof, so that the upper surface 5d of the IC card 5 is pressed against the engagement element 11 or the top plate 15.

That is, the IC card 5 is retained in its inclined posture within the card insertion space 6 and sandwiched between the contacting terminal 13 of the contact 7 and the engagement piece 11 and top plate 15 so that the pressure contacting state is maintained. Accordingly, the engagement element 11 and the top plate 15 function as an upper abutment means for the IC card 5 and prevent upward ejection of the IC card 5 caused by a push-up force of the contacts 7.

The base plate 8, the first and second side walls 9, 10 and the engagement elements 11 are of one-piece structure integrally molded from synthetic resin. Similarly, the base plate 8, the first and second side walls 9, 10 and the top plate 15 are of one-piece structure integrally molded from synthetic resin.

The surface mounting structure for the card connector is designed such that the IC card 5 can easily be inserted and withdrawn and can effectively be prevented from slipping out towards the upper inclination end H' side (card inlet/outlet port 17 side) which would otherwise occur due to vibrations.

In order to enhance ease of insertion of the IC card 5 in an actual device 1, an inclination guide surface 19 is provided on an upper surface of an external wall of the electronic device for defining a connector-contained space opposing the card inlet/outlet port 17. The IC card 5 is inserted and withdrawn via the inclination guide surface 19.

As means for preventing slip-out of the IC card 5 more reliably, a latch arm 20 extending from the base plate 8 towards the upper inclination end H' side is integrally formed and provided at its free end with an upwardly directing hook 21. The upwardly directing hook 21 is disposed in opposing relation to an opening plane of the card inlet/outlet port 17.

Accordingly, the IC card 5 is, as shown in FIGS. 6 to 8, inserted into the space 6 while pressing down the upwardly directing hook 21 of the latch arm 20. At the time when the insertion of the IC card 5 has been completed, the latch arm 20 is restored and the upwardly directing hook 21 is engaged with a rear end face 5b of the IC card 5 so that the IC card 5 is prevented from withdrawal.

In order to mount the connector body 3 in a proper position on the wiring circuit board 4, a plurality of positioning pins 22 are disposed on the base plate 8 and those positioning pins 22 are inserted into positioning holes 23 formed in the wiring circuit board 4 to thereby set a placing position.

As described previously, one end of the base plate 8, which forms the card connector body 3, is of greater height H than the other end which is of height L. And the undersurface 24 of the base plate 8, i.e., connector body is disposed opposite the wiring circuit board 4 in parallel relation such that the undersurface 24 is in contact with or in proximately spaced relation to the wiring circuit board 4.

Accordingly, the inclination surface 18 of the upper surface of the base plate 8 and the card insertion space 6 are inclined at an inclination angle a with respect to the undersurface 24 of the base plate 8. Similarly, the first and second side walls 9, 10, the engagement elements 11 and the top plate 15 are inclined at an inclination angle a which corresponds to the inclination angle α of the inclination surface 18 of the upper surface of the base plate 8.

Accordingly, the manufacturing conditions of those elements and the placing conditions of the contacts 7 with respect to the base plate 8 are generally the same as in the case where the inclination surface 18 is a horizontal surface.

Figure 9A:
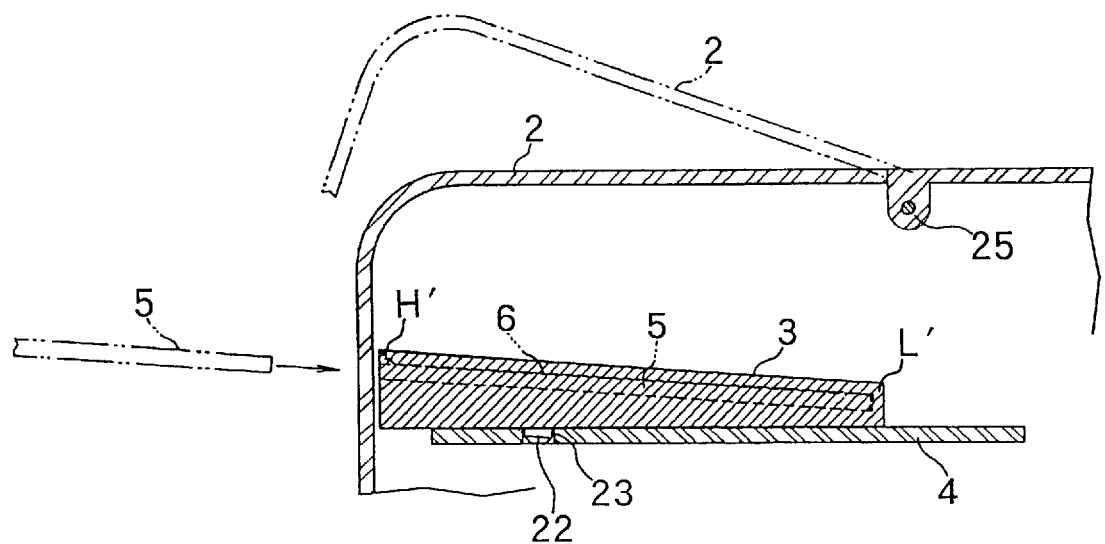
FIG. 9A is a sectional view showing a state in which a given electronic device is provided with a closure member and the closure member is opened to expose a card connector body in order to allow insertion of an IC card.

FIG. 9A shows an example in which a closure member 2, which can be opened and closed through a hinge 25, is disposed at an external wall of the electronic device 1. When the closure member 2 is opened, the connector body 3 is planarly exposed. In accordance with FIGS. 5A–5D, the IC card 5 is inserted for contact into the card insertion space 6 from slantwise above.

Figure 9B:
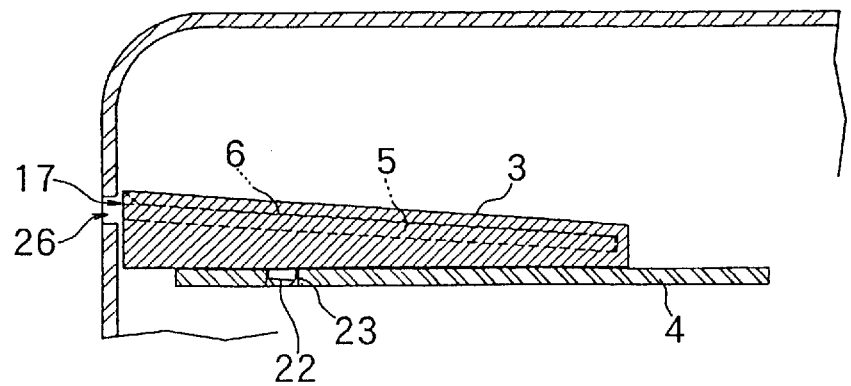
FIG. 9B is a sectional view showing a state in which a given electronic device is provided with a card inlet/outlet port and an IC card is inserted into and withdrawn from a card connector body through the card inlet/outlet port

On the other hand, FIG. 9B shows another example in which a card inlet/outlet port 26 is formed in the external wall of the electronic device 1 in such a manner as to oppose the card inlet/outlet port 17 of the connector body 3, The card inlet/outlet ports 17, 26 are in communication with each other in proximate relation, The IC card 5 is inserted for contact into the card insertion space 6 from slantwise above through the inlet/outlet ports 17, 26. In this example, it is accepted that proper card ejecting means for pushing the IC card 5 out of the connector body 3 is employed.

In the case where the upper abutment is constituted by the engagement element 11, the upper surface 5d of the IC card S is generally exposed. By pushing up the upper surface 5d of the IC card 5 by a finger through the exposed window 27, the IC card 5 can easily be pushed out through the card inlet/outlet port 17 located at the upper inclination end H'.

Also, as shown in FIGS. 2 and 3, the top plate 15 is dimensioned such that it does fully cover the entire upper surface 5d of the IC card 5 and a central portion of the IC card S, for example, is restricted by the top plate 15. The IC card 5 can be pushed out by pushing up the front end of the IC card 5 with a finger inserted through the window 27 formed in the lower inclination end L' of the top plate 15.

According to the present invention, there is no need of a provision of an IC pressing cover member with respect to the card connector which is exposed by opening a closure member formed on the external wall of a given electronic device. The IC card may simply be inserted into the device slantwise from outside for reliable pressure contact. The card connector can be simplified in structure and decreased in cost. Moreover, the contacting position can be prevented from slipping and the performance of the card inserting/withdrawing operation can be enhanced.

In addition, irrespective of whether a card inlet/outlet port is formed in an external wall of a given electronic device or there is a provision of a closure member, the IC card can easily be inserted or withdrawn from slantwise above and the IC card can be prevented from being accidentally slippingly withdrawn by vibrations.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What is claimed is:

1. A mounting structure of a card connector for use with an IC card, said mounting structure comprising a base plate having contacts for contacting the IC card, said base plate being surface mounted on an upper surface of a wiring circuit board through said contacts, wherein an upper surface of said base plate is inclined with respect to the upper surface of said wiring circuit board to define an inclination surface, a card insertion space being formed by said inclination surface of said base plate, a card inlet/outlet port being formed at an upper inclination end of said base plate to allow for insertion of the IC card into said card insertion space from said upper inclination end to a lower inclination end of said base plate such that, when the IC card is inserted into said card insertion space through said card inlet/outlet port, the IC card is retained in an inclined posture within said card insertion space so that the IC card can be pressure contacted with said contacts of said base plate.

2. A mounting structure of a card connector according to claim 1, wherein said contacts have surface mounting terminals, respectively, and are arranged in array on both an upper inclination end side and a lower inclination end side of said base plate, said surface mounting terminal of each of said contacts which are arranged on the upper inclination end side projects toward a surface mounting side of said upper inclination end, and said surface mounting terminal of each of said contacts which are arranged on the lower inclination end side projects toward a surface mounting side of said lower inclination end.

3. A mounting structure of a card connector according to claim 1, further comprising first and second sidewalls projecting from said inclination surface of said base plate, said card insertion space being defined between said first and second sidewalls.

4. A mounting structure of a card connector according to claim 3, further comprising engagement elements projecting inwardly from said first and second sidewalls, respectively, said card insertion space being further defined between said base plate and said engagement elements.

5. A mounting structure of a card connector according to claim 3, further comprising a top plate mounted between said first and second sidewalls, said card insertion space being further defined between said base plate and said top plate.

6. A mounting structure of a card connector according to claim 1, wherein said contacts are elongated generally in a direction from said upper inclination end toward said lower inclination end of said base plate.

7. A mounting structure of a card connector according to claim 6, wherein said contacts include a first row of contacts disposed on an upper inclination end side of said base plate and a second row of contacts disposed on a lower inclination end side of said base plate.

8. A mounting structure of a card connector according to claim 7, wherein said contacts include contact terminals, respectively, for contacting electrode pads of the IC card when the IC card is inserted in said card insertion space; and said contact terminals of said first row of contacts are disposed above said base plate a greater distance than said contact terminals of said second row of contacts are disposed above said base plate.

* * * * *